United States Patent
Lin et al.

(10) Patent No.: US 9,386,523 B2
(45) Date of Patent: Jul. 5, 2016

(54) POWER-SAVING DATA SCHEDULING SYSTEM IN LTE AND METHOD THEREOF

(71) Applicant: National Chiao Tung University, Hsinchu (TW)

(72) Inventors: Ying-Dar Lin, Hsinchu (TW); Yu-Hsien Kuo, Hsinchu (TW); Li-Ping Tung, Hsinchu (TW); Yuan-Cheng Lai, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 50 days.

(21) Appl. No.: 14/298,303

(22) Filed: Jun. 6, 2014

(65) Prior Publication Data

US 2015/0131504 A1 May 14, 2015

(30) Foreign Application Priority Data

Nov. 14, 2013 (TW) .............................. 102141422 A

(51) Int. Cl.
*G08C 17/00* (2006.01)
*H04W 52/02* (2009.01)

(52) U.S. Cl.
CPC ............ *H04W 52/0225* (2013.01); *Y02B 60/50* (2013.01)

(58) Field of Classification Search
CPC ................................................ H04W 52/0225
See application file for complete search history.

(56) References Cited

U.S. PATENT DOCUMENTS

| | | | | |
|---|---|---|---|---|
| 8,902,781 B2 * | 12/2014 | Xu | ......................... | H04W 28/18 370/252 |
| 9,198,218 B2 * | 11/2015 | Oh | ..................... | H04W 52/0229 |
| 2008/0267105 A1 * | 10/2008 | Wang | ................ | H04W 52/0225 370/311 |
| 2010/0208660 A1 * | 8/2010 | Ji | ...................... | H04W 52/0225 370/328 |
| 2011/0059745 A1 * | 3/2011 | Yi | ......................... | H04W 24/08 455/452.2 |

(Continued)

OTHER PUBLICATIONS

Kuo et al., "Minimizing Power Consumption in LTE Data Scheduling with the Constraints of Channel Condition and QoS", A Thesis Submitted to Institute of Computer Science and Engineering, National Chiao Tung University (Published Jun. 7, 2013).

*Primary Examiner* — Kevin Mew
(74) *Attorney, Agent, or Firm* — Mintz Levin Cohn Ferris Glovsky and Popeo, P.C.; Peter F. Corless; Steven M. Jensen

(57) ABSTRACT

A power-saving data scheduling system includes a period decision module for selecting a cycle having a shortest delay time as a discontinuous reception (DRX) cycle for each user from quality of service (QoS) requirements related to network services and channel conditions, and a start offset decision module for calculating the number of users in each of periods of the DRX cycle. In addition, a DRX-aware scheduling module is provided for extending the on period by increasing priority of the user and resetting an inactivity timer if a period required by the user's load is shorter than an off period. Optimal DRX parameters and DRX-aware scheduling are used to resolve the existing issues that the channel conditions, system load and QoS are not taken into consideration when the DRX parameters are determined. Moreover, a power-saving data scheduling method is also provided.

10 Claims, 6 Drawing Sheets

(56) References Cited

U.S. PATENT DOCUMENTS

| | | | |
|---|---|---|---|
| 2011/0199910 A1* | 8/2011 | Oh | H04W 52/0229 370/241 |
| 2011/0199951 A1* | 8/2011 | Kwon | H04W 52/0212 370/311 |
| 2012/0120828 A1* | 5/2012 | Anderson | H04W 52/0225 370/252 |
| 2013/0107782 A1* | 5/2013 | Anas | H04W 52/02 370/311 |
| 2013/0242829 A1* | 9/2013 | Ge | H04W 56/005 370/311 |
| 2013/0294313 A1* | 11/2013 | Han | H04W 52/0216 370/311 |
| 2013/0301420 A1* | 11/2013 | Zhang | H04W 76/048 370/241 |
| 2014/0185467 A1* | 7/2014 | Heo | H04W 52/54 370/252 |
| 2015/0043515 A1* | 2/2015 | Zhang | H04W 76/048 370/329 |
| 2016/0021699 A1* | 1/2016 | Oh | H04W 52/0229 370/311 |

* cited by examiner

POWER-SAVING DATA SCHEDULING SYSTEM IN LTE AND METHOD THEREOF

CROSS-REFERENCES TO RELATED APPLICATIONS

This application claims under 35 U.S.C. §119(a) the benefit of Taiwanese Application No. 102141422, filed Nov. 14, 2013, the entire contents of which is incorporated herein by reference.

BACKGROUND

1. Field of the Invention

This disclosure relates to a power-saving technique for a discontinuous reception mechanism in a wireless communication system, and, more particularly, to a data scheduling system and a method thereof that satisfy quality of service (QoS) and minimize power consumption.

2. Description of Related Art

Long term evolution (LTE) is becoming the most promising communication technology, which has a high transmission rate and high coverage, but consumes more power. Moreover, LTE defines a discontinuous reception (DRX) power-saving mechanism. The DRX power-saving mechanism may turn off radio-frequency circuits periodically, in order to achieve the power-saving effect. However, packets may not be received when turning off the radio-frequency circuits, such that quality of service (QoS) will be affected.

Since a wireless network has variable channel conditions, different DRX parameters are required under different channel conditions in order to achieve a high transmission rate. However, the DRX parameters are determined without considering the channel conditions of users. Therefore, it is necessary to solve the channel adaptation problem by dynamically adjusting DRX parameters. Additionally, traffic and QoS of network services are not considered in the manner of DRX parameters. For example, a single user may simultaneously request a plurality of network services. Each of network services may have different traffic pattern and QoS requirements. In order to satisfy QoS for all the network services, it is necessary to acquire a set of optimal DRX parameters for transmission of wireless networks.

Moreover, if on periods that radio-frequency circuits are turned on by users are not distributed evenly, the users may turn on their radio-frequency circuits simultaneously and share the network resource, such that transmission or reception of data may not be completed and power consumption may also be increased. Therefore, it is also necessary to obtain a proper DRX start offset in order to uniformly disperse the on durations of the network devices and improve the transmission efficiency as well as the power saving. Most commonly, the DRX start offset parameters of all the users have to be re-determined while an additional user requests for the network services. Such a mechanism cannot change the DRX parameters only for the additional user, such that the system load caused by signaling may be increased.

Further, DRX inactivity timer will be reset if a user is scheduled. With this feature, a user that will go for sleep at the next subframe is scheduled to extend the inactivity timer if the packets of the user are not transmitted completely. However, frequently extending the on duration will significantly increase power consumption especially in the case of poor channel condition or high system load. The reason is that the system may not have sufficient radio resources to allocate to the user in its extended on duration.

Therefore, for the sake of meeting the requirements of the system load, it is necessary to provide a method for acquiring the optimal DRX parameters for LTE so as to satisfy QoS requirements and consume less power.

Accordingly, solutions to the problems described above have been long sought, but prior developments have not taught or suggested any solutions and, thus, solutions to the problems have long eluded those skilled in the art. Therefore, there is a heretofore-unaddressed need to overcome defects and shortcomings described above.

SUMMARY

In view of the above-mentioned problems of the prior art, the objective of the disclosure is to obtain optimal DRX parameters according to QoS requirements and current channel conditions and to solve the channel adaptation problem by adjusting the parameters dynamically.

Another objective of the disclosure is to evenly distribute on periods of users such that the QoS requirements are satisfied and power consumption is reduced. Moreover, it may determine whether a on period should be extended according to a system load.

In order to achieve the above and other objectives, the disclosure provides a power-saving data scheduling system for long term evolution (LTE), comprising a period decision module that selects the shortest delay time of each of users from quality of service (QoS) requirements related to network services as a discontinuous reception (DRX) cycle, acquires a current channel transmission rate according to current channel conditions and obtains an on period of the DRX cycle of each of the users through the current channel transmission rate; and a start offset decision module that calculates the number of the users in each of on periods of the DRX cycles and determines the start offset of the DRX cycle for new users that is used by a minimum number of the users.

In an embodiment, the start offset decision module may weight the number of users in each of on period of the DRX cycle to generate a weighted value. The start offset decision module finds the least common multiple cycle from all DRX cycles which is divided into a plurality of segments (i.e., the length of a segment is the same as the DRX cycle of a new user), accumulates weighted values of the plurality of the segments, and generates the accumulated weighted values corresponding to the same offsets of the users in a segment. Thus, it can determine the start offset of the DRX cycle for a new user that is used by a minimum number of users.

In another embodiment, the power-saving data scheduling system further comprises an DRX-aware scheduling module that is used for determining whether the user can acquire wireless resources based on a system load to extend the on period when the buffer of a user device has packets to transmit and the on period is about to end In addition, the DRX-aware scheduling module may extend the on period by increasing priority of the users and resetting an inactivity timer if the system load is less than the free resource from the off period.

The disclosure further provides a power-saving data scheduling method for LTE, comprising the steps of selecting the shortest delay time of each of users from QoS requirements related to network services as a DRX cycle; acquiring a current channel transmission rate according to current channel conditions, and obtaining an on period of the DRX cycle of each of the users through the current channel transmission rate; calculating the number of the users in each of the on periods; and determining the start offset of the DRX cycle for a new user that is used by a minimum number of the users.

In yet another embodiment, the power-saving data scheduling method further comprises the step of determining whether the user can acquire wireless resources based on a system load and extending the on period when a buffer of the user's device has some packets to transmit and the on period will end soon.

The power-saving data scheduling system for LTE and method of the disclosure may determine the DRX parameters dynamically based on the quality of service (QoS) requirements and current channel conditions in order to satisfy the QoS requirements and to reduce power consumption. The power-saving data scheduling system determines the on duration as well as the DRX cycle. In addition, the power-saving data scheduling system may select and determine a start offset of the DRX cycle for a new user according to all the DRX cycles used by the users in the system with a view to evenly distributing each of the on periods. Moreover, the power-saving data scheduling system of the disclosure may determine whether an on period is extended to accommodate more users in LTE. In other words, if necessary, an on period may be extended and QoS may be satisfied based on the scheduling mechanism.

BRIEF DESCRIPTION OF DRAWINGS

The disclosure can be more fully understood by reading the following detailed description of the preferred embodiments, with references made to the accompanying drawings, wherein.

DETAILED DESCRIPTION

The following illustrative embodiments are described in sufficient detail to enable those skilled in the art to make and use the disclosure. Those with ordinary skills in the art can readily understand the other functions of the disclosure after reading the disclosure of this specification. The disclosure can also be implemented with different embodiments and examples. Various details described in this specification can be modified based on different viewpoints and applications without departing from the scope of the disclosure.

Figure 1:
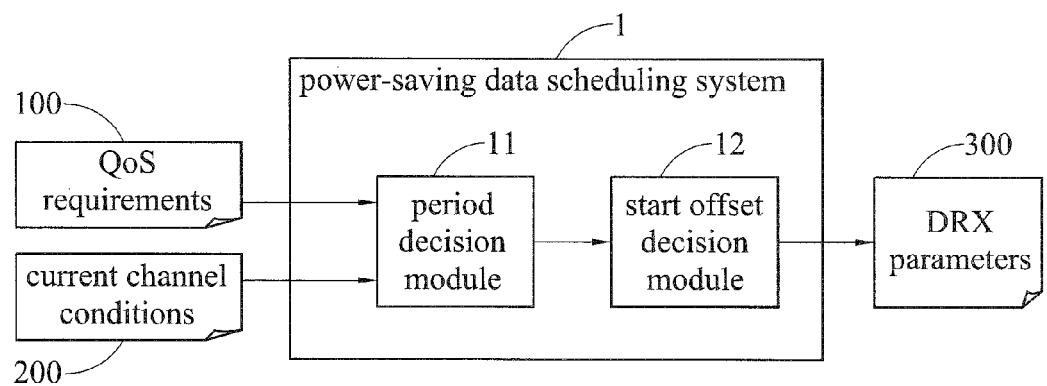
FIG. 1 is a block diagram illustrating a power-saving data scheduling system for LTE according to an embodiment of the disclosure.

Referring to FIG. 1, a block diagram of a power-saving data scheduling system 1 for LTE is illustrated according to the disclosure. The power-saving data scheduling system 1 determines optimal DRX parameters 300 for a DRX cycle with a view to evenly distributing each of on periods of a cycle to users. As such, users are enabled to rapidly transmit data by fully utilizing LTE bandwidth while radio frequency circuits (hereinafter referred to as "circuits") are turned on such that power consumption is reduced when unnecessary circuits are turned off. The power-saving data scheduling system 1 of the disclosure comprises a period decision module 11 and a start offset decision module 12.

The period decision module 11 selects the shortest delay time as a discontinuous reception (DRX) cycle of each of users from QoS requirements 100 related to network services, acquires a current channel transmission rate according to current channel conditions 200, and obtains an on period of the DRX cycle of each of users through the current channel transmission rate. In other words, the DRX cycle of each of the users is determined according to the QoS requirements 100 in network services due to different network services requiring different QoS requirements. For example, with respect to a telephone service, if an off period of the DRX cycle is too long, the quality of the telephone service will be reduced. That is, the off period of the DRX cycle is required to be shorter to maintain better call quality. Similarly, an off period of the DRX cycle may be shorter while videos are transmitted. On the contrary, an off period of the DRX cycle may be longer if a file is transmitted via File Transfer Protocol (FTP).

Concerning QoS required by each of users, the period decision module 11 selects the shortest delay time as a DRX cycle of each of the users. That is, a DRX cycle with the length as the shortest delay time among all users can be used to satisfy all QoS requirements for users.

The period decision module 11 further acquires a current channel transmission rate according to the current channel conditions 200, and obtains an on period of the DRX cycle of each of users through the current channel transmission rate. In other words, based on the current channel conditions 200, the period decision module 11 acquires a current channel transmission rate so as to define a period that a radio-frequency circuit is activated. During the on period, the users can finish their transmissions as soon as possible and go for turning off the radio-frequency circuit in order to save power.

Figure 2:
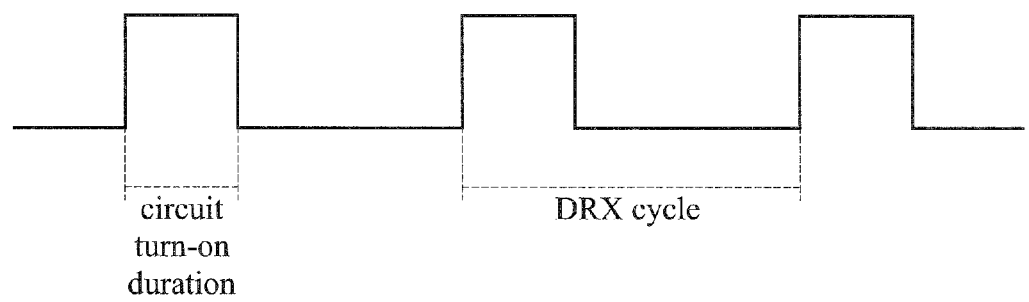
FIG. 2 illustrates a series of DRX cycles with on periods in the power-saving data scheduling system for LTE according to an embodiment of the disclosure.

An on period of the DRX cycle is defined according to the current channel conditions 200. As shown in FIG. 2, a DRX cycle includes one on period and one off period. Once an on period is defined, a radio frequency circuit in a user's device may be activated in the on period if required.

A ratio of the on period and the DRX cycle is equal to a ratio of a sum of transmission rates required by all the network services and the current channel transmission rate. In other words, the ratio between the on period and the DRX cycle can be obtained by calculating the ratio of the sum of the transmission rates required by all the network services and the current channel transmission rate. Therefore, the on period is determined based on the current channel conditions (i.e., the transmission speed), as described previously.

After the DRX cycle is defined based on QoS requirements 100 and the current channel conditions 200 of a user, concerning a plurality of users, if needs to know how to fulfill all the requirements of the plurality of users so as to maintain QoS 100 and reduce power consumption.

The start offset decision module 12 may calculate the number of users in each of on periods of the DRX cycle and determine the start offset of the DRX cycle for a new user that is used by a minimum number of users. That is to say, the start offset decision module 12 may calculate a total number of users in each of the on periods of the DRX cycle and determine the start offset of the DRX cycle for a new user that is used by a minimum number of the users.

In an embodiment of the disclosure, the start offset decision module 12 may generate a weight value by weighting the number of users on each of periods of the DRX cycle (e.g., squaring the number of users at each of periods of the DRX cycles). The least common multiple cycle from all DRX cycles is found first. The least common multiple DRX cycle is divided into a plurality of segments (i.e., the length of a segments is as the same as the DRX cycle of a new user), and the weighted values of the plurality of segments are accumulated. The accumulated weighted values of the users are generated in a segment of the DRX cycle to determine the start offset value.

On this occasion, the on periods of DRX cycles for users may stagger, and may also improve transmission efficiency and minimize power consumption. For a new user, the start offset of the DRX cycle that is used by a minimum number of users is determined, such that the DRX cycle of the existing user is not required to alter. As such, a suitable start offset can be obtained for a new user. Therefore, the power-saving data scheduling system 1 for LTE does not require to rearrange the DRX cycles of all of the users, and thus the system load caused by signaling is reduced.

FIGS. 3A to 3D illustrate a series of DRX cycles with on periods used by the number of the users in the power-saving data scheduling system for LTE according to an embodiment of the disclosure. That is, the start offset decision module 12 may calculate the number of users in each of periods of the DRX cycles.

In an embodiment of the disclosure, there are a plurality of users in a network environment, and the DRX cycles of the users are determined. Then, a cycle start offset will be determined.

Figure 3A:
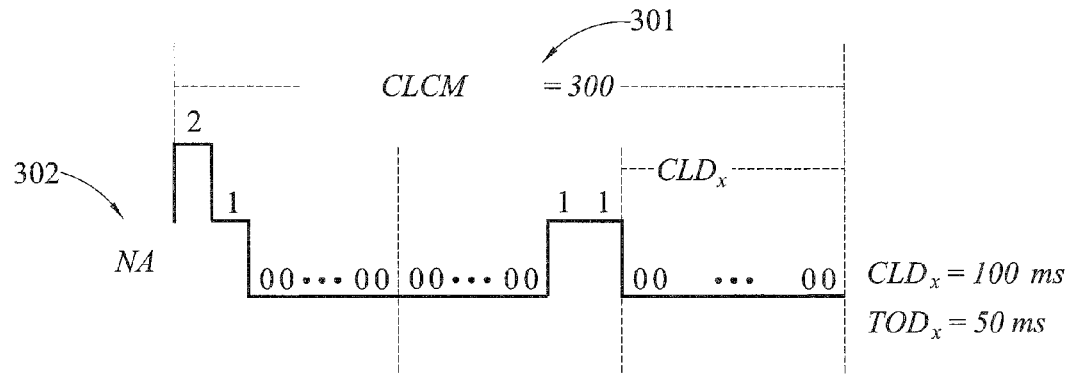
FIGS. 3A to 3D illustrate a series of DRX cycles with on periods used by the number of users in the power-saving data scheduling system for LTE according to an embodiment of the disclosure.

As shown in FIG. 3A, the target is the cycle start offset of user $UE_x$. In this embodiment, the DRX cycles $CLD_x$ of user x is 100 ms, and $TOD_x$, the on period of the user x, is 50 ms. In other words, the on period is a half of the user's DRX cycle.

The least common multiple (CLCM) 301 of the DRX cycles of users is calculated. In the embodiment of the disclosure, CLCM 301 is 100 ms, that is, CLCM 301 includes three $CLD_x$ segments. NA represents a number of awake users (i.e., a number of radio-frequency circuits are turned on). $NA=\{NA_j, 1 \le j \le CLCM\}$, where $NA_j$ 302 denotes a number of users at a time point j.

As shown in FIG. 3A, CLCM 301 is divided into three $CLD_x$ segments, of which each comprises 100 time points (i.e., each time point represents 1 ms), representing as 2100 . . . 00, 00 . . . 0011, 00 . . . 00 (indicating a number of users), from left to right. For example, as shown in FIG. 3A, the leftmost time point indicates that two users are turning on and using their radio-frequency circuits, and the second leftmost time point indicates that only one user is turning on and using his/her radio-frequency circuits.

Moreover, the equation $NS=\{NS_j|NS_j=(NA_j)^2, 1 \le j \le CLCM\}$ is used to allow the subsequent calculations still maintaining the same distribution information of users' awake times. Therefore, $NA_j$ is weighted by squaring the number of the users at each time point, and then an NS 303 is generated.

Figure 3B:
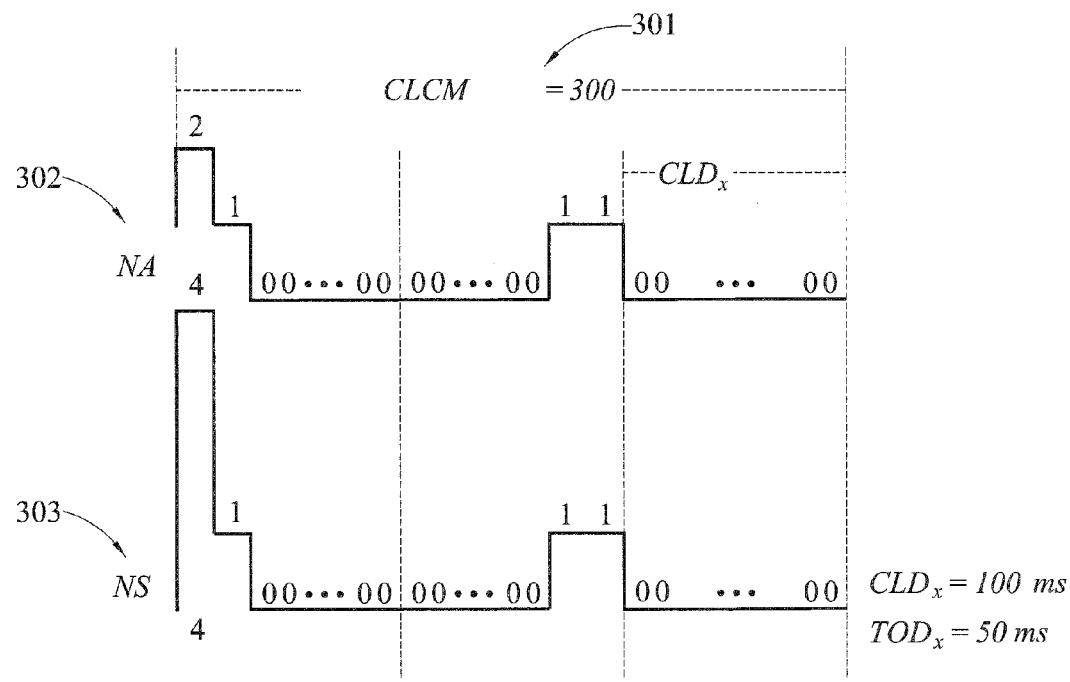

As shown in FIG. 3B, after $NA_j$ is weighted at each time point, the results 4100 . . . 00, 00 . . . 0011, 00 . . . 00, from left to right, are generated. The purpose of the weighting step is to emphasize that some users are turning on and using their radio-frequency circuits during the time points. The weighted values reduce the chances of other users to turn on radio-frequency circuits at the time points when the value of start offset of the DRX cycle is determined.

Figure 3C:
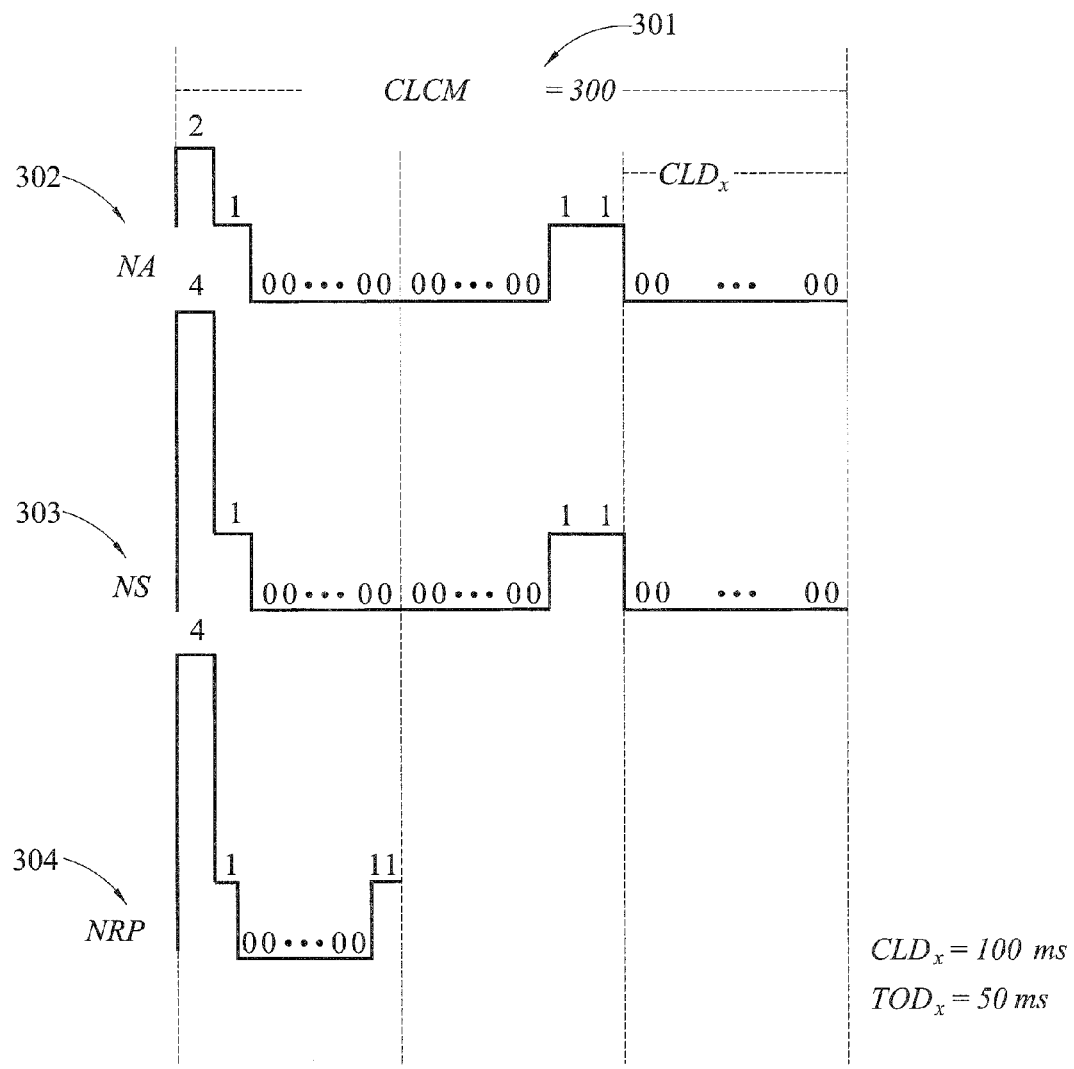

As shown in FIG. 3C, in order to reduce the number of operations required to select an optimal cycle start offset of a user $UE_x$, the operation may be reduced to a range of 1 to $CLD_x$ by using the following equation:

$$NRP_{x,k} = \sum_{\forall j, ((j-1) \mod CLD_x)+1=k} NS_j,$$

$$1 \le j \le CLCM,$$

$$1 \le k \le CLD_x$$

where $CLD_x$ indicates a DRX cycle of a user $UE_x$. As described previously, for the DRX cycle of a $UE_x$, the NS 303 may be divided into a plurality of segments, and the weighted values of each of the plurality of segments are accumulated to form an NRP 304. The purpose of the NRP 304 is to calculate the number of the users in a cycle, such as the DRX cycle. As shown in FIG. 3C, the accumulated weighted values of these three segments 4100 . . . 00, 00 . . . 0011 and 00 . . . 00 are 4100 . . . 0011, indicates that the leftmost time point of each of the plurality of segments has the heaviest transmission load. Therefore, the NRP 304 can be obtained by using $NRP_x = \{NRP_{x,k}, 1 \le k \le CLD_x\}$.

Figure 3D:
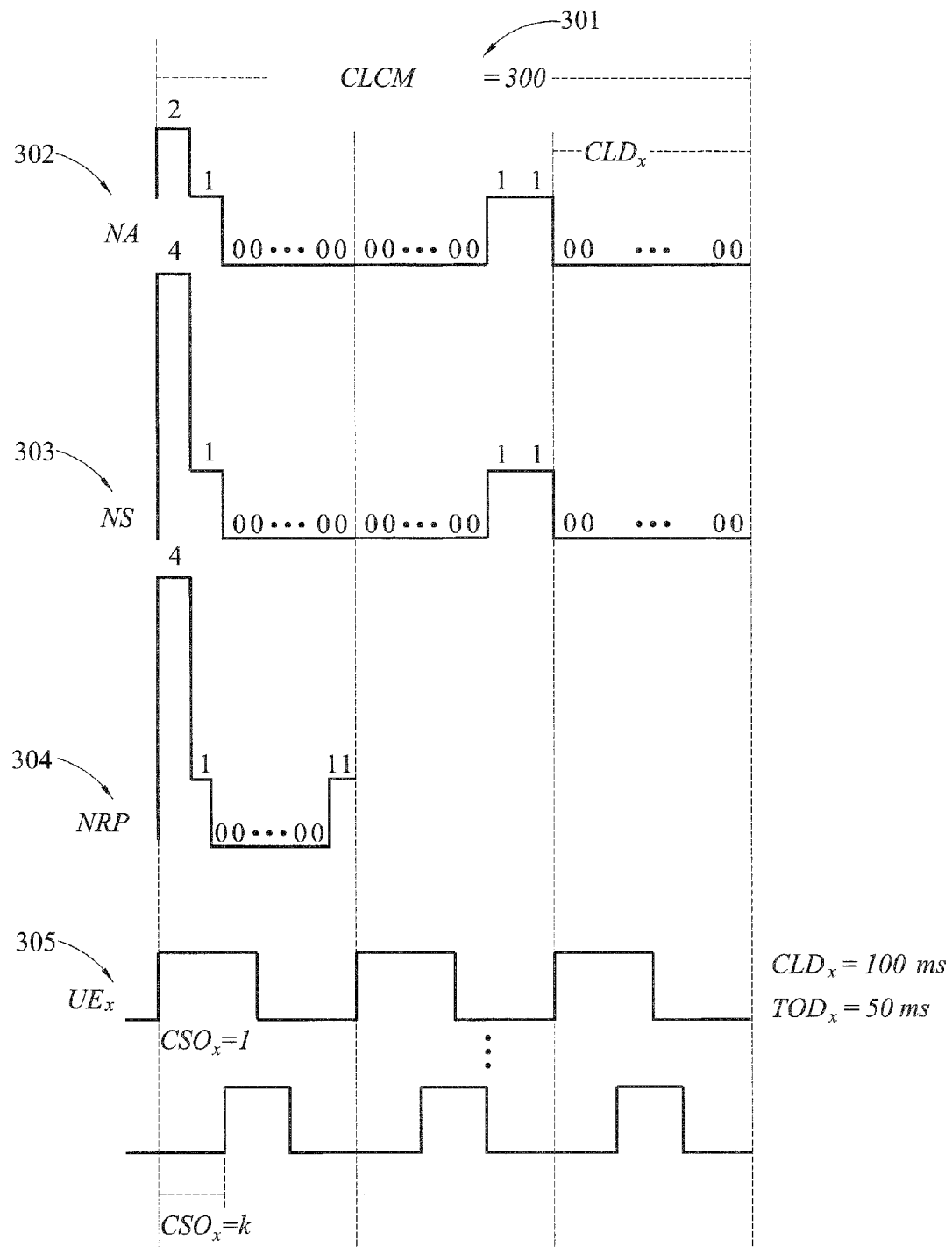

As shown in FIG. 3D, the optimal cycle start offsets of the user $UE_x$ is calculated by using the following equation:

$$CSO_x = \arg\min_{1 \le k \le CLD_x} \left\{ \sum_{j=k}^{k+TOD_x-1} NRP_{x,((j-1) \mod CLD_x+1)} \right\}$$

where $CSO_x$ 305 represents a cycle start offset of a user $UE_x$. A k value from a range of 1 to $CLD_x$ of the DRX cycle of the user $UE_x$ is determined, such that $NRP_{x,k}$ corresponding to an awake period $k-(k+TOD_x-1)$ of a user $UE_x$ has a least accumulated value. $TOD_x$ is an on period of a user $UE_x$, and the k value is taken as a $CSO_x$ 305. That is to say, the cycle start offset of the user $UE_x$ is set as k, such that the awake time of the user $UE_x$ least overlaps with the awake times of other users.

As shown in FIG. 3D, the leftmost time point represents 4 in NRP 304, and the second leftmost, the $99^{th}$ and the $100^{th}$ time points represent 1. Therefore, the user $UE_x$ will not be arranged to turn on his/her radio-frequency circuit during the on period at the first and second time points since other users are turning on and using their radio-frequency circuits at these time points. A time point of the cycle start offset having k value (k=3 in this embodiment) is determined as an on period for the user. As shown in FIG. 3D, if $CSO_x=1$, users may compete for network resources during the on period at the first and second time points. As such, network services can be obtained for users by setting the k value as 3, in order to avoid competing for network resources at the first and second time points.

Figure 4:
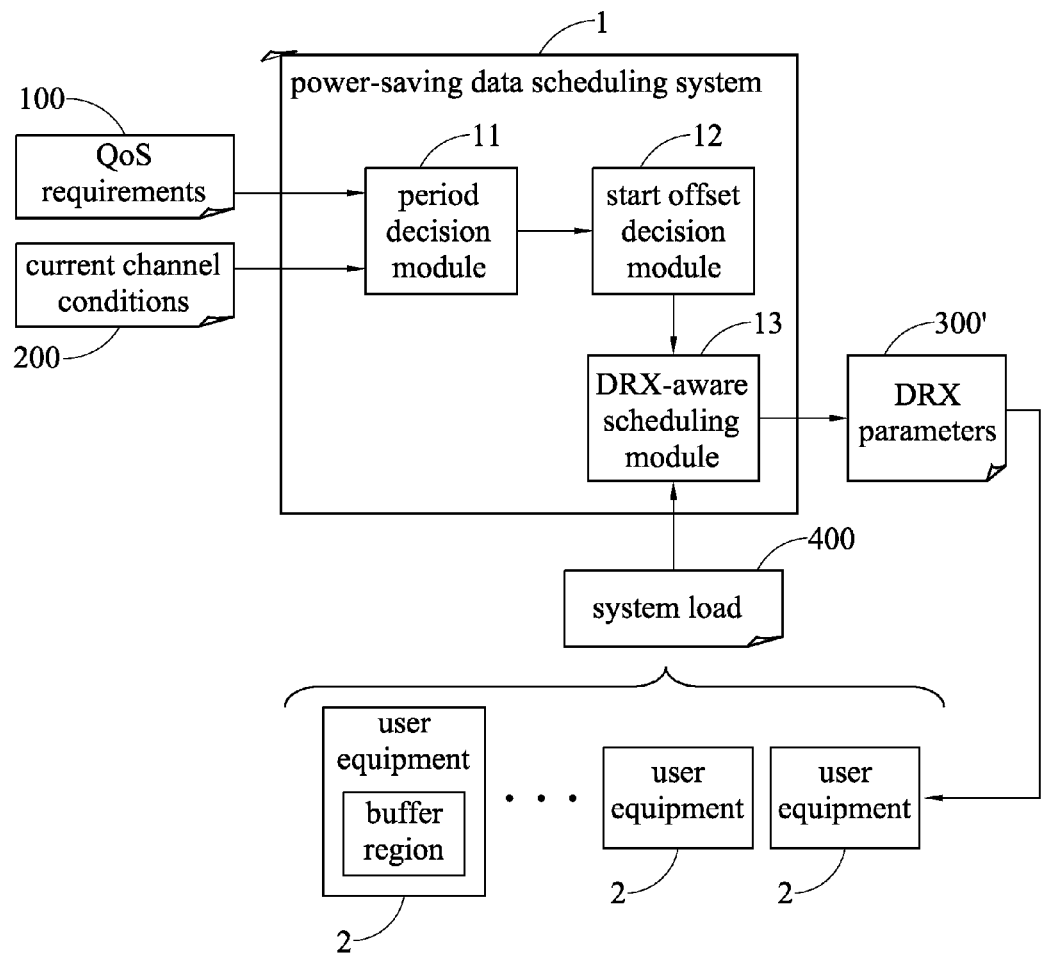
FIG. 4 is a block diagram of a power-saving data scheduling system for LTE according to another embodiment of the disclosure.

Referring to FIG. 4, a block diagram of a power-saving data scheduling system for LTE is illustrated according to another embodiment of the disclosure. In addition to the period decision module 11 and the start offset decision module 12, the power-saving data scheduling system 1 further comprises an DRX-aware scheduling module 13 that determines whether the user acquire wireless resources based on a system load 400 to extend the on period in order to improve QoS requirements 100.

After receiving the QoS requirements 100 and the current channel conditions 200, the period decision module 11 and the start offset decision module 12 may provide proper DRX parameters to users. However, when the on period ends, but transmission of certain packets are not completed, it is important to determine how these packets can be transmitted efficiently without consuming unnecessary power. In the embodiment of the disclosure, the DRX-aware scheduling module 13 is provided to determine whether the on period should be extended.

When a user device has packets in a buffer required to transmit, and the on period is about to end, the DRX-aware scheduling module 13 determines whether the user may use wireless resources according to the system load 400, and may extend the on period. In other words, the DRX-aware scheduling module 13 may extend the on period through a scheduling mechanism. Before a radio-frequency circuit of a user device is turned off, and certain packets are required to transmit, the DRX-aware scheduling module 13 may determine whether the on period is extended according to the system load 400, in order to improve QoS. Therefore, the power-saving data scheduling system 1 for LTE may generate updated DRX parameters 300' that conform to the system load 400. Additionally, the user equipment 2 is informed to determine whether the on period is required to extend.

For instance, if the system load is not heavy, QoS requirements are improved by extending the on period. On the contrary, if the system load is heavy, more power is consumed while the radio-frequency circuit is continuously turned on since wireless resources for packet transmission may also not be obtained. Therefore, if the system load is too heavy, the radio-frequency circuit is turned off in order to reduce power consumption according to the original DRX parameters.

According to the embodiment of the disclosure, the on period may be extended while the packets required to transmit are not completed, but the on period is about to end. If the transmission time of the packets is shorter than the on period after the radio-frequency circuit is turned off, a priority for the user is increased, and an inactivity timer is reset. In the embodiment of the disclosure, the inactivity timer is a timer that records a time required to turn off the radio-frequency circuit.

Moreover, the extension of an on period is described as follows. When transmission of packets in the buffer of the user equipment 2 is not completed, and the radio-frequency circuit is going to be turned off at the next time point, it can be determined whether the user has a chance to obtain wireless transmission resources according to the system load, and the on period may be extended while the user is able to obtain the wireless transmission resources.

Figure 5:
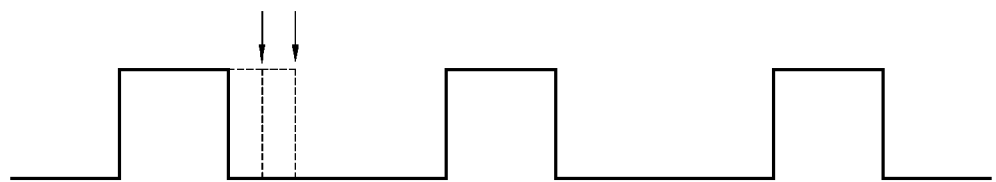
FIG. 5 is a series of DRX cycles with on periods illustrating the extension of an on period in the power-saving data scheduling system for LTE according to another embodiment of the disclosure.

The on period is extended when a priority for the user is temporarily increased before the circuit is turned off. As such, the user is allowed to obtain the wireless transmission resources. Additionally the inactivity timer is reset to extend the on period. As shown in FIG. 5, if the user is determined to obtain the transmission resources, the on period may be extended, as illustrated in FIG. 5 by the first arrow from the left. The on period may be further extended (as illustrated in FIG. 5 by another arrow) according to the amount of the resources.

The priority can be calculated by the following equation:

$$P_x(t) = \begin{cases} P_x^*(t) + \alpha, & TOD_x \leq 1 \text{ and } TIA_x \leq 1 \text{ and } \text{loading}_x < \text{off\_ratio}_x \\ P_x^*(t), & \text{otherwise} \end{cases}$$

where $P_x(t)$ represents the priority of the DRX-aware schedule, $P_x^*(t)$ represents the priority calculated by an original scheduling mechanism, $TOD_x$ represents the current on period of the user x, and $TIA_x$ represents the current inactivity timer.

When $TOD_x \leq 1$ and $TIA_x \leq 1$ are satisfied, the radio-frequency circuit is going to be turned off at the next time point, and the system will determine whether the user's on period is extended according to a load $\text{loading}_x$ and a ratio $\text{off\_ratio}_x$ of the off period and the DRX cycle.

Accordingly, if the loading of the users whose priorities are higher than the current user $UE_x$ is less than a time ratio of turning off the circuit of user $UE_x$, that is, $\text{loading}_x < \text{off\_ratio}_x$, it indicates that the time period after turning off the circuit is longer than the transmission time required by the users having a high priority, such that the user $UE_x$ may transmit packets due to some available transmission resources. Therefore, the on period that the user $UE_x$ is using the wireless transmission circuit may be extended by temporarily increasing the user's priority. On the contrary, if no transmission resources are available, the on period that the user is using the wireless transmission circuit is not extended. Here, the value of $P_x^*(t)$ by a value α is increased, and the value α is set as a value greater than all possible values of $P_x^*(t)$.

The load $\text{loading}_x$ required by other users having a higher priority may be calculated by the following equation:

$$\text{loading}_x = \sum_{\forall i, p_i^*(t) > p_x^*(t)} \frac{R_i(t)}{r_i(t)},$$

where $R_i(t)$ represents an average transmission rate of a user $UE_i$, $r_i(t)$ represents a transmission rate according to the current channel conditions, at which all wireless transmission resources are allocated to user $UE_i$. In addition, the loading only considers other users who have a higher priority than the user $UE_x$.

Furthermore, $\text{off\_ratio}_x$ is calculated by the following equation:

$$\text{off\_ratio}_x = \frac{TOP_x}{CLD_x},$$

where $TOP_x$ represents a time from the time that the circuit is turned off to the time that the circuit is turned on again, and $\text{off\_ratio}_x$ represents a ratio of the off period and the user's $UE_x$ DRX cycle.

Figure 6:
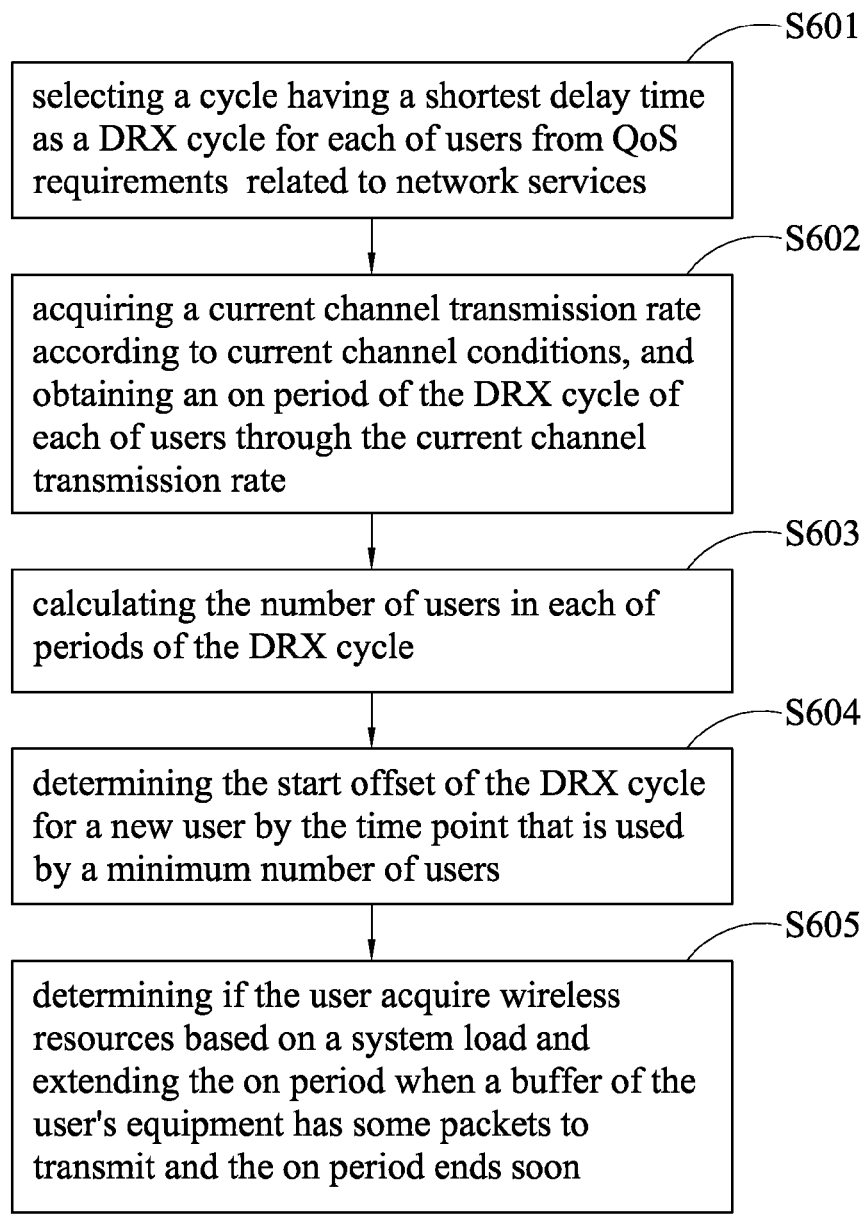
FIG. 6 is a flow chart of a power-saving data scheduling method for LTE according to the disclosure.

Referring to FIG. 6, a flow chart of a power-saving data scheduling method for LTE is illustrated according to the disclosure. In step S601, a cycle having a shortest delay time is selected as a DRX cycle for each of users from QoS requirements related to network services. In other words, a cycle having a shortest delay time is determined as a DRX cycle for each of users based on the QoS requirements related to the network services. Therefore, the circuit may be turned on or turned off periodically to meet a minimum requirement for all the network services. Then, step S602 is performed.

In step S602, a current channel transmission rate is acquired according to current channel conditions, and an on period of the DRX cycle of each of the users are obtained through the current channel transmission rate. In this step, the users' on periods of the DRX cycle may be determined according to the current channel conditions. In other words, the channel transmission rate may be acquired once the current channel conditions are known. As such, the on periods are defined with a view to providing better transmission efficiency.

According to the disclosure, a ratio of the on period and the DRX cycle is a ratio of a total of transmission rates required by all the network services and the current channel transmission rate. In other words, the ratio of the on period and the DRX cycle is determined according to the ratio of the total of transmission rates required by all the network services and the current channel transmission rate. Step S603 is subsequently performed.

In step S603, the number of the users in each of periods of the DRX cycle are calculated. In this step, the number of users in the DRX cycle may be calculated according to each of periods of the DRX cycle. Accordingly, it may be determined how many users are using transmission circuits according to the number of the users in each of periods of the DRX cycle. Based on step S603, all the users' on periods may be distributed evenly, and a proper on period may be assigned to a new user.

The on periods of the DRX cycle are weighted by squaring the number of the users in each of periods of the DRX cycle so as to generate weight of values. Then, a series of DRX cycles (i.e., the least common multiple cycles from all DRX cycles) are divided into a plurality of segments. After that, the weighted values of the plurality of segments are accumulated. Therefore, the accumulated weighted values of the users are generated in a segment of the DRX cycle to determine the start offset value. The step of weighting the on periods of the DRX cycle is to emphasize that some users are turning on their circuits at some of time points in the DRX cycle. The number of the users at different segments are accumulated because the least common multiple cycles may have a plurality of segments in terms of the DRX cycle of a new user. Therefore, the minimum accumulated number is selected for the purpose of avoiding assigning a busy transmission resources to a new user. As such, a start offset may be obtained in a simple manner. Then, step S604 is performed.

In step S604, the start offset of the DRX cycle for a new user is determined by the time point that is used by a minimum number of the users. The minimum accumulated number is calculated in step S603. Accordingly, start offset of the DRX cycle for a new user as a time point that is used by a minimum number of the users is determined in step S604. That is to say, after a better start offset is obtained, a start time point of the on period may be determined by the new user. Therefore, based on this step, it is unnecessary to change the arrangement of the current other users. The system load may be reduced.

According to the disclosure, the power-saving data scheduling method for LTE further includes step S605. In step S605, it is determined whether the user can acquire wireless resources according to the system load, and the on period is extended when a buffer of the user's equipment still has packets to transmit and the on period ends at the next time point. According to the system load, the on period may be extended, and thus the user is allowed to acquire the wireless resources.

The on period may be extended while packets required to transmit are not completed, but the on period is about to end. If the transmission time of the packets is shorter than the on period after the radio-frequency circuit is turned off, a priority for the user is increased, and an inactivity timer is reset. According to the disclosure, the inactivity timer is a timer that records a time required to turn off the radio-frequency circuit.

According to the above descriptions of the disclosure, the power-saving data scheduling system for LTE may dynamically determine DRX parameters based on QoS requirements and current channel conditions. The DRX cycle constituted by the DRX parameters may satisfy the QoS requests and minimize power consumption. Moreover, the power-saving data scheduling system may select and determine an start offset of the DRX cycle that is used by a minimum number of user for a new user according to all the DRX cycles used by the users in the system with a view to evenly distributing each of periods of a cycle to turn on their transmission circuits. Further, the power-saving data scheduling system may determine whether an on period is extended to accommodate more users in LTE, according to the system load. In other words, if necessary, an on period may be extended and QoS may be satisfied based on the scheduling mechanism.

The foregoing descriptions of the detailed embodiments are only used to illustrate the features of the disclosure, and they should not be construed as to limit the disclosure in any way. The above embodiments can be modified by those with ordinary skill in the art without departing from the scope of the present invention as defined in the following appended claims.

What is claimed is:

1. A power-saving data scheduling system for long term evolution (LTE), comprising:
    a period decision module configured for selecting a cycle having a shortest delay time as a discontinuous reception (DRX) cycle for each of users from quality of service (QoS) requirements related to network services, acquiring a current channel transmission rate according to current channel conditions, and obtaining an on period of the DRX cycle of each of the users through the current channel transmission rate; and
    a start offset decision module configured for calculating the number of the users in each of periods of the DRX cycle and determining a start offset of the DRX cycle that is used by a minimum number of the users for a new user.

2. The power-saving data scheduling system of claim 1, wherein a ratio of the on period to the DRX cycle is equal to a ratio of a total of transmission rates required by all of the network services to the current channel transmission rate.

3. The power-saving data scheduling system of claim 1, wherein the on period of the DRX cycle is weighted to generate a weighted value, the DRX cycle is divided into a plurality of segments, weighted values of the plurality of segments are accumulated, and the accumulated weighted values corresponding to the start offsets of the users are generated in a segment of the DRX cycle.

4. The power-saving data scheduling system of claim 1, further comprising a DRX-aware scheduling module configured for determining if the users acquire wireless resources based on a system load to extend the on period when a buffer of a user equipment has packets to transmit and the on period ends.

5. The power-saving data scheduling system of claim 4, wherein the DRX-aware scheduling module extends the on period by increasing priority of the users and resetting an inactivity timer if a period required by a user load is shorter than an off period.

6. A power-saving data scheduling method for LTE, comprising the steps of:
    selecting a cycle having a shortest delay time as a DRX cycle for each of users from QoS requirements related to network services;

acquiring a current channel transmission rate according to current channel conditions, and obtaining an on period of the DRX cycle of each of the users through the current channel transmission rate;

calculating the number of the users in each of periods of the DRX cycle; and determining a start offset of the DRX cycle that is used by a minimum number of the users for a new user.

7. The power-saving data scheduling method of claim 6, wherein a ratio of the on period to the DRX cycle is equal to a ratio of a total of transmission rates required by all the network services to the current channel transmission rate.

8. The power-saving data scheduling method of claim 6, wherein the calculating step comprises weighing the on periods of the DRX cycle to generate weighted values, dividing the DRX cycle into a plurality of segments, accumulating the weighted values of the plurality of the segments, and generating the accumulated weighted values corresponding to the start offsets of the users in a segment of the DRX cycle.

9. The power-saving data scheduling method of claim 6, further comprising determining if the users acquire wireless resources based on a system load and extending the on period when a buffer of a user equipment has packets to transmit and the on period is about to end.

10. The power-saving data scheduling method of claim 9, wherein the extending step comprises increasing priority of the users and resetting an inactivity timer if a period required by a user load is shorter than an off period.

* * * * *